United States Patent [19]

Beckerman

[11] Patent Number: 4,591,769
[45] Date of Patent: May 27, 1986

[54] ARRANGEMENT FOR CONTROLLING THE SPEED OF A DC MOTOR

[76] Inventor: Howard L. Beckerman, 151 Ivy Hill Rd., Red Bank, N.J. 07701

[21] Appl. No.: 676,097

[22] Filed: Nov. 29, 1984

[51] Int. Cl.⁴ .............................................. H02P 5/175
[52] U.S. Cl. .................... 318/331; 318/257; 318/314; 318/344; 318/345 D
[58] Field of Search ............... 315/257, 312, 314, 315, 315/317, 331, 344, 345 B, 345 C, 345 CA, 345 D, 345 H

[56] References Cited

U.S. PATENT DOCUMENTS 3,453,517 7/1969 Kennedy et al. .................... 318/257
3,673,479 6/1972 Horton ............................ 318/345 X
3,857,076 12/1974 Hetland ........................... 318/345 X
3,857,077 12/1974 Kasmer ............................ 318/345 X
4,390,823 6/1983 Brown et al. ................. 318/345 CA X
4,412,158 10/1983 Jefferson et al. .................... 318/257
4,465,957 8/1984 Crockett ......................... 318/345 D
4,481,448 11/1984 Bishop ........................... 318/331 X Primary Examiner—William M. Shoop, Jr.
Assistant Examiner—Bentsu Ro

[57] ABSTRACT

An improved arrangement for controlling the speed and direction of rotation of a DC motor responds to a variable bipolar input signal. A bipolar threshold detector coupled to the motor is used for the selective triggering of a triac during the appropriate half wave polarity of an AC source. Triac failure is prevented by a protection circuit. The arrangement incorporates a speed servo and senses the voltage across the triac to detect the speed of the motor.

20 Claims, 5 Drawing Figures

ARRANGEMENT FOR CONTROLLING THE SPEED OF A DC MOTOR

DESCRIPTION

BACKGROUND OF THE INVENTION

This invention relates to DC motor control and, more particularly, to an arrangement for controlling the direction and speed of rotation of a DC motor from an AC source.

DC motor control from an AC source is, in general, well known. However, it would be desirable to provide such control wherein speed and direction are both controlled in a linear fashion from a single input, where the speed remains constant with changing load requirements, where a single power device is used for rectification, amplification, voltage variation and polarity reversal, and where that power device is protected from failure.

SUMMARY OF THE INVENTION

In accordance with the principles of this invention, the foregoing and additional objects are attained by providing an arrangement for controlling a DC motor from a source of AC power comprising means for connecting a first side of the motor to a first side of the AC power source, phase controlled power applying means connected between the second side of the motor and the second side of the AC power source for selectively applying power to the motor, threshold voltage detecting means connected to the second side of the motor for providing a threshold signal when the magnitude of the voltage at the second side of the motor exceeds a predetermined threshold, ramping means responsive to the threshold signal for providing a ramped voltage signal for the duration of the threshold signal, speed detector means coupled to the motor for providing a speed signal indicative of the speed of the motor, input means for providing an input signal indicative of a desired speed for the motor, servo means coupled to receive the speed signal and the input signal for providing a servo signal corresponding to the difference between the speed signal and the input signal, and comparator means coupled to receive the servo signal and the ramped voltage signal for controlling the power applying means.

DESCRIPTION OF THE DRAWINGS

The foregoing will be more readily apparent upon reading the following description in conjunction with the drawings in which like elements in different figures thereof have the same reference character applied thereto and wherein.

DETAILED DESCRIPTION

Figure 1:
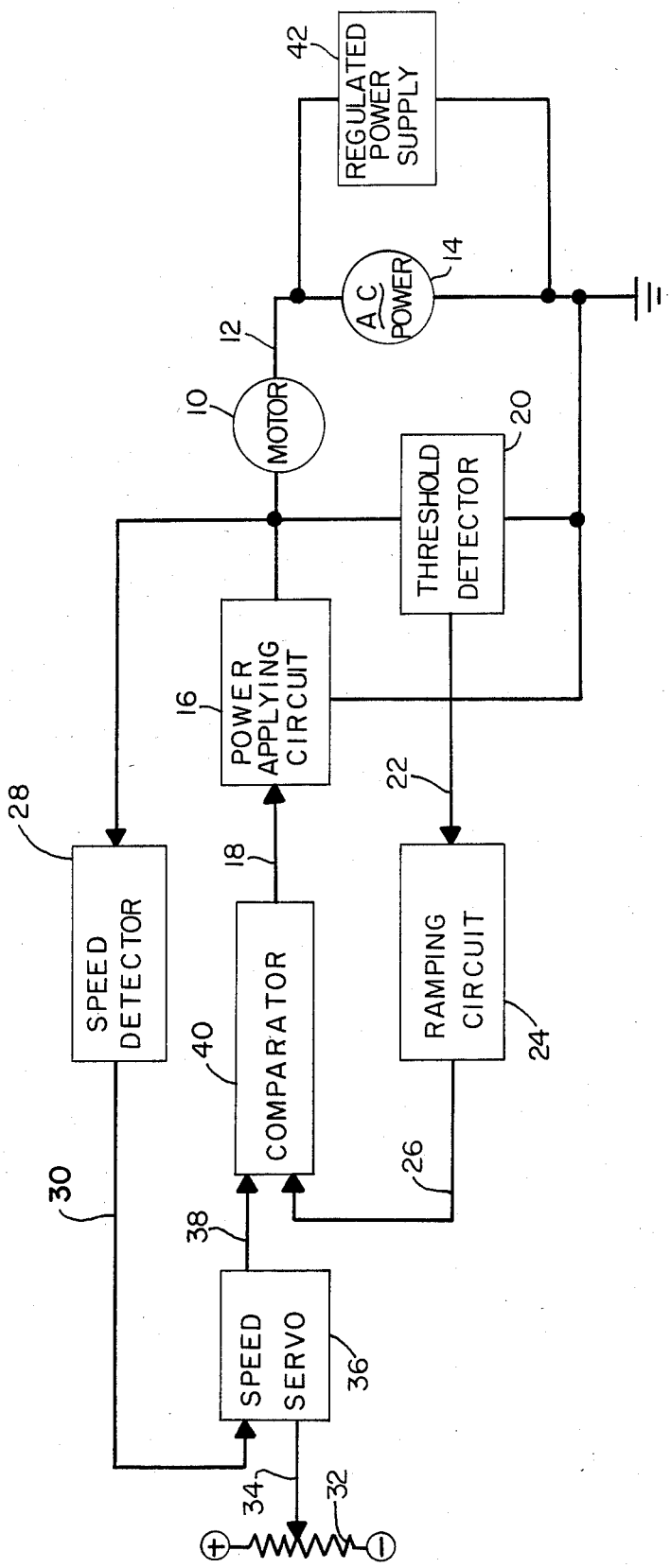
FIG. 1 is a general block diagram of circuitry constructed in accordance with the principles of this invention.

Referring now to the drawings, FIG. 1 shows a general block diagram of circuitry constructed in accordance with this invention wherein a DC motor 10 has a first side connected via a lead 12 to a first side of an AC power source 14. A power applying circuit 16 is connected between the second side of the motor 10 and the second side of the AC source 14 and is arranged to selectively apply power to the motor 10 whenever triggered by a suitable signal over the lead 18. A threshold detector 20 is connected to the second side of the motor 10 and provides a threshold signal on the lead 22 when the magnitude of the voltage at the second side of the motor 10 exceeds a predetermined threshold. A ramping circuit 24 responds to the threshold signal and provides a ramped voltage signal on the lead 26 for the duration of the threshold signal.

A speed detector circuit 28 is coupled to the motor 10 and is arranged to provide a speed signal on the lead 30 indicative of the speed of the motor 10. Input means including a potentiometer 32 coupled between opposite polarity voltage sources is utilized to provide an input signal on the lead 34 indicative of a desired speed for the motor 10. The polarity of the input signal is indicative of the desired direction of rotation of the motor 10 and the magnitude of the input signal is indicative of the speed. A speed servo 36 is coupled to receive the speed signal on the lead 30 and the input signal on the lead 34 and is arranged to provide a servo signal on the lead 38 which corresponds to the difference between the speed signal and the input signal. A comparator circuit 40 is coupled to receive the servo signal on the lead 38 and the ramped voltage signal on the lead 26. The comparator circuit 40 provides a signal on the lead 28 to trigger the power applying circuit 16 when the ramped voltage signal crosses the servo signal.

A regulated power supply 42 is coupled to the AC source 14 for providing a regulated DC voltage for the use of the remainder of the circuitry of FIG. 1.

Figure 2A:
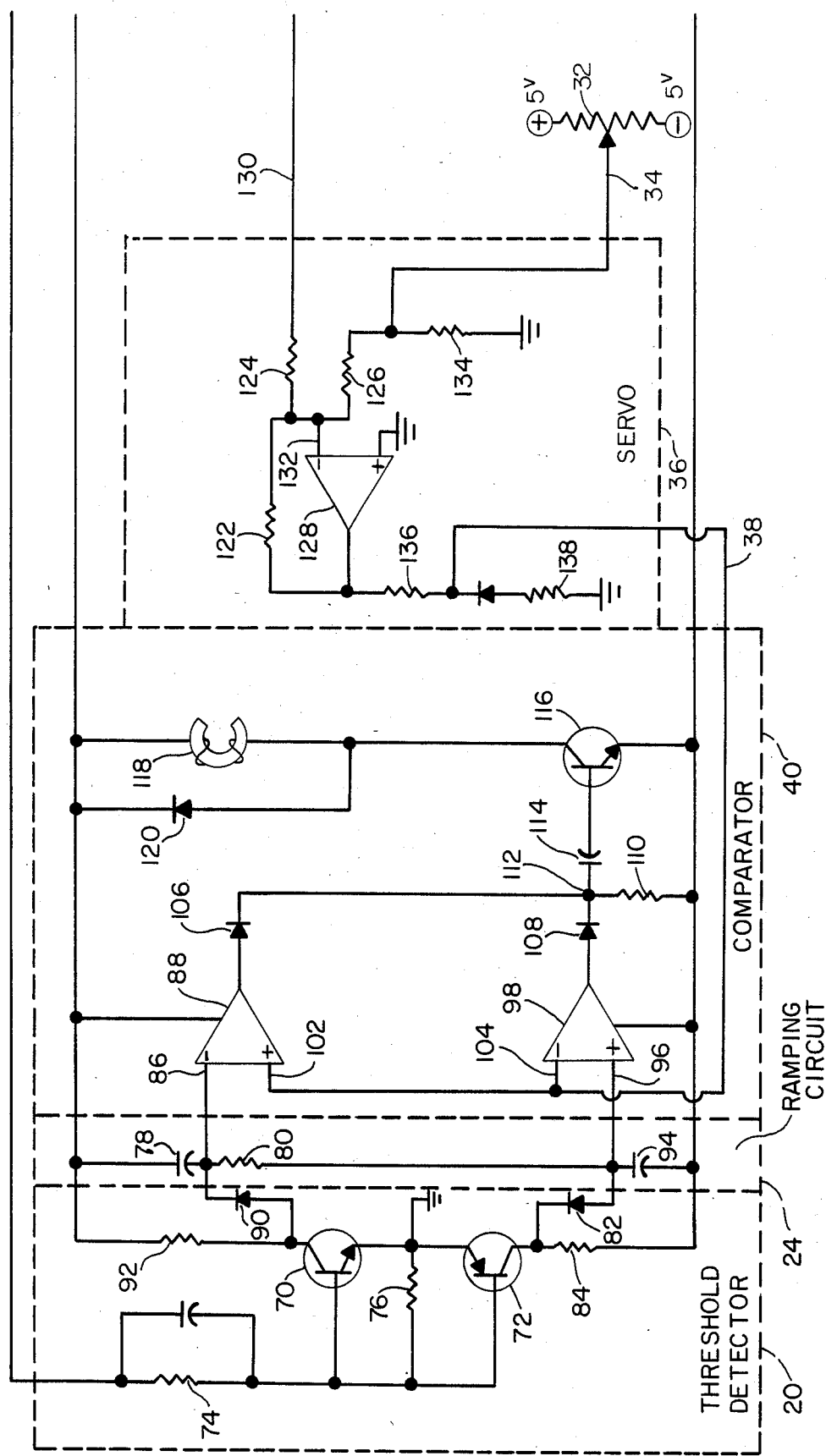
FIGS. 2A and 2B together form a detailed circuit schematic diagram of an illustrative embodiment implementing FIG. 1.
Figure 2B:
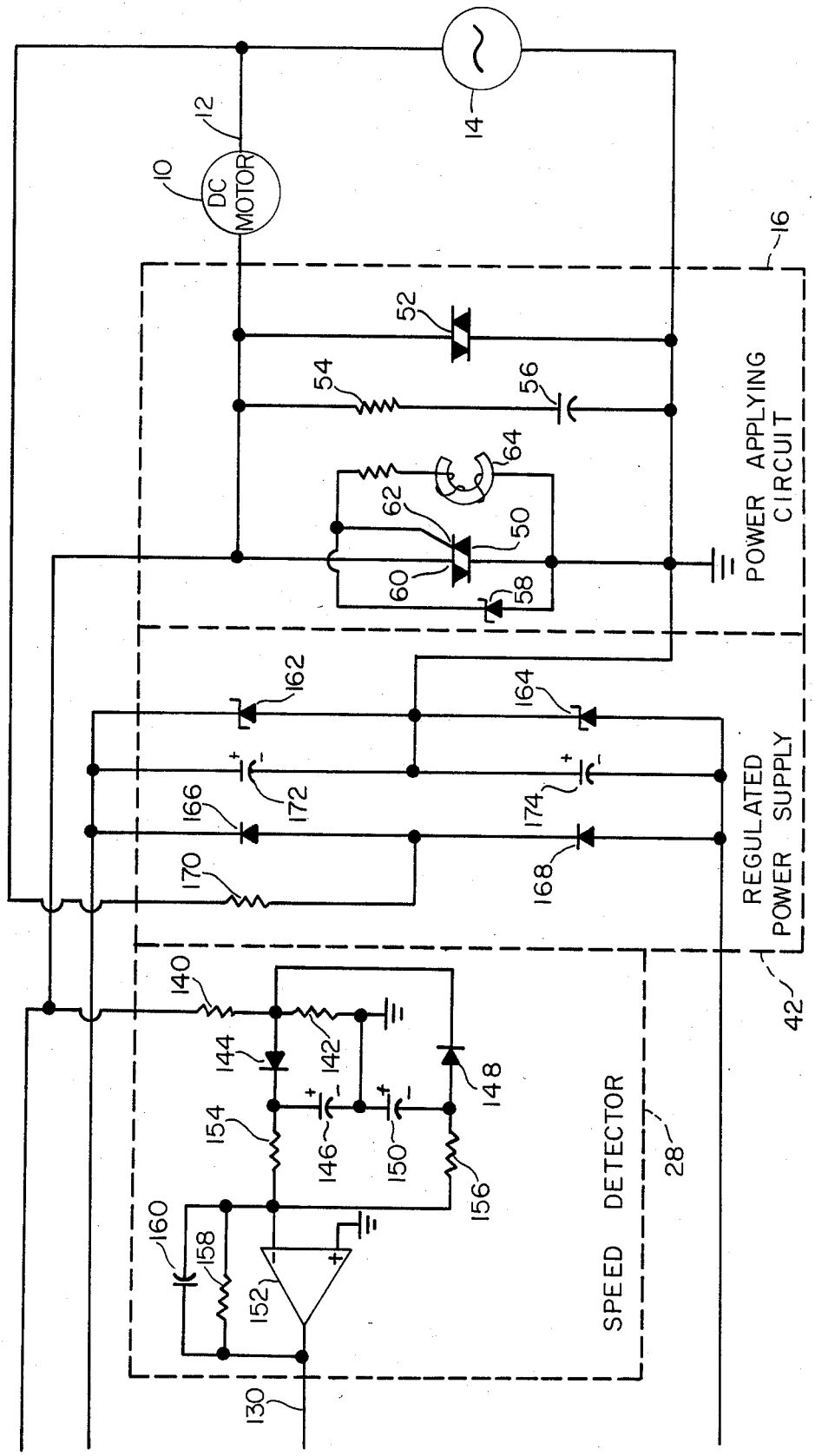

Referring now to FIGS. 2A and 2B, the power applying circuit 16 includes a bidirectional phase fired device, in particular a triac 50. To prevent failure of the triac 50, three protective arrangements are provided. The VMOS device 52 clamps any high voltage which might exceed the rated voltage of the triac 50. A snubber circuit consisting of the resistor 54 and the capacitor 56 stops high frequency electrical noise from turning on the triac 50 without a gate signal. The zener diode 58 prevents damage to the gate of the triac 50 from overvoltage or overcurrent due to its internal capacitance between the terminal 60 and the gate terminal 62.

As is well known, once a triac is turned on, it will remain on until the current through it goes to zero. Therefore, only a 10 μs pulse typically need be provided to turn the triac on. The triac 50 requires 1.5 volts at 50 ma at its gate to be turned on, and this is facilitated by the use of a 3:1 step down pulse transformer having its secondary winding 64 coupled to the gate terminal 62 of the triac 50. Thus, a 17 ma input pulse at 12 volts applied to the primary winding of the transformer produces a 51 ma, 4 volt output pulse at the winding 64. The use of a pulse transformer to fire the triac 50 isolates the logic circuitry from the power circuitry, allows a smaller 12 volt supply current, and automatically connects the gate of the triac 50 back to ground after the pulse. Grounding the gate improves the immunity of the triac 50 to electrical noise several fold over conventional methods of gating.

The threshold detection function is performed by the transistors 70 and 72 and the resistors 74 and 76. The resistors 74 and 76 form a voltage divider for the voltage across the triac 50 so that when this voltage reaches approximately +20 volts the transistor 70 turns on and when the voltage reaches approximately −20 volts the transistor 72 turns on. It is critical to the functioning of the system that the voltage is sufficiently great when the triac 50 is turned on so that the minimum triac latching current is drawn to keep the triac on. Also, the triac gating must not occur after the voltage drops below about 20 volts because of the possibility of triggering the opposite polarity half wave during this time. This is particularly critical when driving an inductive load like a motor because full current does not develop immediately upon triggering the triac and also because the current continues even after the voltage has gone to zero.

Figures 3A, 3B:
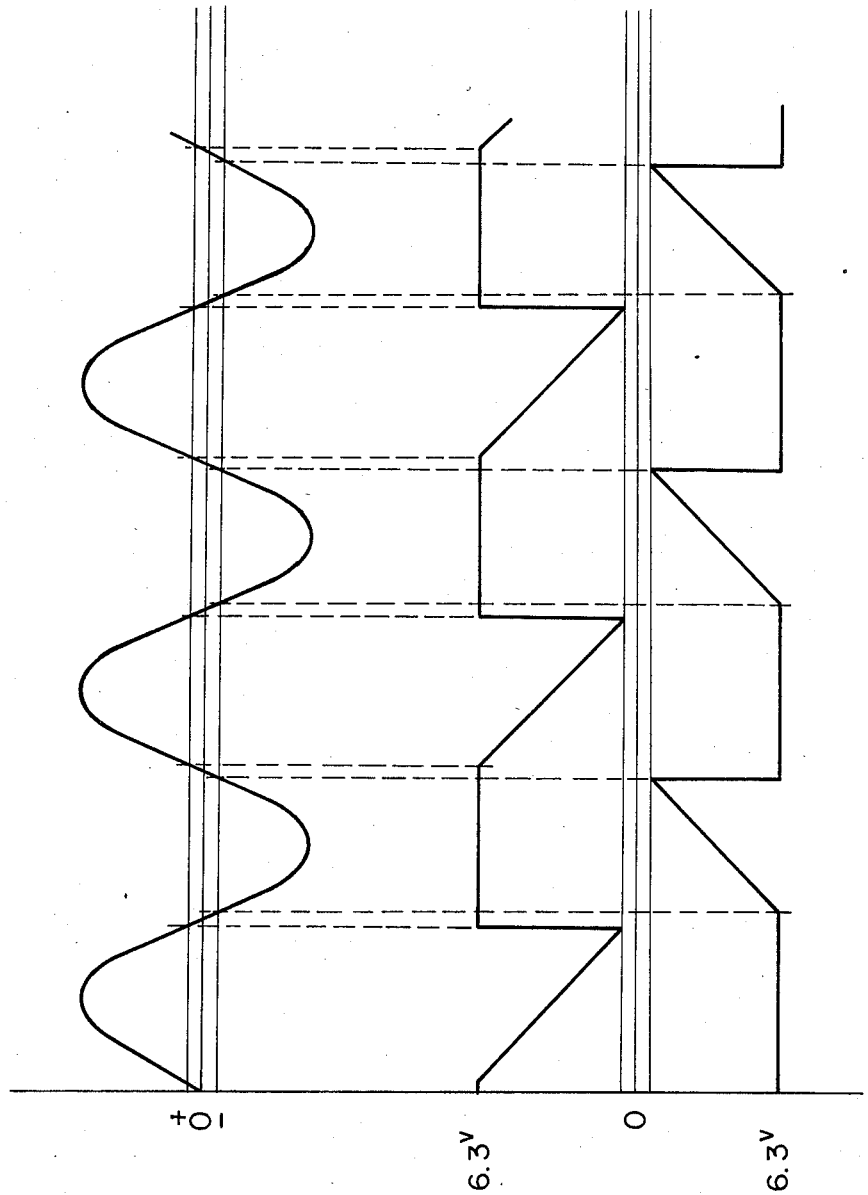
FIGS. 3A and 3B are voltage waveforms useful in understanding the operation of the circuit of FIGS. 2A and 2B.

When the transistor 70 turns on, the capacitor 78 charges through the resistor 80, the diode 82 and the resistor 84, creating a ramped voltage at the input 86 of the operational amplifier 88. When the transistor 70 turns off, the capacitor 78 quickly discharges through the diode 90 and the resistor 92. Likewise, when the transistor 72 turns on, the capacitor 94 charges through the resistor 80, the diode 90 and the resistor 92, creating a ramped voltage at the input 96 of the operational amplifier 98. When the transistor 72 turns off, the capacitor 94 quickly discharges through the diode 82 and the resistor 84. FIGS. 3A and 3B illustrate this operation. FIG. 3A shows the AC waveform across the triac 50. The upper curve in FIG. 3B shows the ramped voltage at the input 86 of the operational amplifier 88. The lower curve in FIG. 3B shows the ramped voltage at the input 96 of the operational amplifier 98.

The ramped voltages at the inputs 86 and 96 of the operational amplifiers 88 and 98 are compared to a fixed voltage on the lead 38, which is the output of the speed servo 36. The lead 38 is connected to the input 102 of the operational amplifier 88 and to the input 104 of the operational amplifier 98. It can be seen from FIG. 3B that a zero voltage on the lead 38 does not cross either of the ramped voltages. However, as the servo output rises positive it will cross the ramped voltage on the input 86 and as it falls negative it will cross the ramped voltage on the input 96. Furthermore, it can be seen that the higher the servo output the earlier in the positive half cycles of the input line voltage the crossing of the ramped voltage occurs. Likewise, the more negative the servo output the earlier in the negative half cycles of the input AC line voltage the crossing of the ramped voltage occurs.

The outputs of the operational amplifiers 88 and 98 are connected to the diodes 106 and 108, respectively, which together with the resistor 110 form an "OR" gate. Thus, when the output of either operational amplifier 88,98 goes high when a respective ramped voltage input crosses the servo output voltage, the junction 112 will go high. The capacitor 114 and the base of the transistor 116 together form a one-shot pulser circuit. Whenever the junction 112 goes high, the capacitor 114 delivers current to the base of the transistor 116 and the collector of the transistor 116 goes low for the duration of the base current pulse. The primary winding 118 of the pulse transformer then sees the full voltage of the power supply for the duration of the pulse. This power pulse is transformed to the secondary winding 64 to turn on the triac 50. The diode 120 clamps the flyback effect of the winding 118 to project the transistor 116 and prevent ringing. When the junction 112 goes low, the capacitor 114 is discharged through the resistor 110.

The speed servo is formed by the resistors 122, 124 and 126 and the operational amplifier 128, which together make up a summing amplifier stage. The motor speed voltage on the lead 130 is summed through the resistor 124 with the input speed voltage through the resistor 126. With no input speed voltage, the input 132 of the operational amplifier 128 is pulled to ground by the resistor 134. The voltage at the input 132 is multiplied by the feedback resistor 122. Small changes in speed or input are then corrected by producing an output error signal on the lead 38 to the comparator 40 through the voltage divider made up of the resistors 136 and 138. This voltage divider prevents the servo output from being outside the range of operation of the comparator.

The speed detector 28 measures the back EMF of the motor, which is proportional to speed. Traditionally, the voltage across the motor has been used to measure back EMF. In the speed detector 28, the voltage across the triac 50 is measured. The resistors 140 and 142 form a voltage divider across the triac 50 to reduce this voltage to levels that can be used by the logic circuitry. The speed detector uses the diode 144 and the capacitor 146 to store the peak positive voltage and the diode 148 and the capacitor 150 to store the peak negative voltage. With the triac 50 off, the voltage across it is the line voltage and the positive and negative peaks are equal in magnitude but opposite in polarity. When, for example, the triac 50 is half on and the motor is running at the proper speed in the "positive" direction, the negative peak voltage will exceed in magnitude the positive peak voltage. The operational amplifier 152, using the resistors 154, 156 and 158, forms a summing amplifier which adds the peak voltages and inverts the sum. Thus, for a "positively" running motor, per the example above, a positive voltage will be provided on the lead 130. The capacitor 160 acts as additional filtering for the operational amplifier 152.

The power used by the logic circuitry is 4 ma at +6 volts and −6 volts and is provided by the regulated power supply 42. Voltage regulation is achieved by the zener diodes 162 and 164 which are in a full wave bridge configuration with the diodes 166 and 168. The resistor 170 drops the voltage to the zener diodes 162 and 164 and the capacitors 172 and 174 filter the supply.

Accordingly, there has been disclosed an improved arrangement for controlling the direction and speed of rotation of a DC motor from an AC source. It is understood that the above-described embodiment is merely illustrative of the application of the principles of this invention. Numerous other embodiments may be devised by those skilled in the art without departing from the spirit and scope of this invention, as defined by the appended claims.

I claim:

1. An arrangement for controlling a DC motor from a source of AC power, comprising:
    means for connecting a first side of said motor to a first side of said AC power source;
    phase controlled power applying means connected between the second side of said motor and the second side of said AC power source for selectively applying power to said motor;
    threshold voltage detecting means connected to said second side of said motor for providing a threshold signal when the magnitude of the voltage at the second side of said motor exceeds a predetermined threshold;
    ramping means responsive to said threshold signal for providing a first ramped voltage signal for the duration of said threshold signal during positive half cycles of said AC power and a second ramped voltage signal for the duration of said threshold signal during negative half cycles of said AC power;

speed detector means coupled to said motor for providing a speed signal having a magnitude indicative of the speed of said motor and a polarity indicative of the direction of rotation of said motor;

input means for providing an input signal having a magnitude indicative of a desired speed for said motor and a polarity indicative of a desired direction of rotation for said motor;

servo means coupled to receive said speed signal and said input signal for providing a servo signal corresponding in magnitude and polarity to the difference between said speed signal and said input signal; and comparator means coupled to receive said servo signal and said first and second ramped voltage signals for controlling said power applying means to apply the appropriate polarity and phase of said AC power to said motor, said comparator means including a first comparator coupled to receive said first ramped voltage signal and said servo signal, a second comparator coupled to receive said second ramped voltage signal and said servo signal, and means for combining the outputs of said first and second comparators.

2. The arrangement according to claim 1 wherein said phase controlled power applying means includes a bidirectional phase fired device.

3. The arrangement according to claim 2 wherein said bidirectional phase fired device comprises a triac.

4. The arrangement according to claim 3 wherein said power applying means further includes a triac protection circuit comprising high voltage clamping means connected across the output terminals of said triac for preventing the voltage across said terminals from exceeding a level damaging to said triac.

5. The arrangement according to claim 4 wherein said clamping means comprises a VMOS device.

6. The arrangement according to claim 3 wherein said power applying means further includes a triac protection circuit comprising a high frequency shunt circuit connected across the output terminals of said triac for preventing high frequency electrical noise from firing said triac.

7. The arrangement according to claim 3 wherein said power applying means further includes a triac protection circuit comprising a zener diode connected between the gate terminal of said triac and one of the output terminals of said triac for limiting the voltage and current across said gate terminal and said one output terminal.

8. The arrangement according to claim 1 further including means for electrically isolating said comparator means from said power applying means.

9. The arrangement according to claim 8 wherein said power applying means includes a phase fired device and said isolating means includes a pulse transformer having its primary coupled to said comparator means and its secondary coupled to the control terminal of said phase fired device.

10. The arrangement according to claim 9 wherein said comparator means includes means for generating a pulse when said ramped voltage signal crosses said servo signal and means for coupling said pulse to said pulse transformer primary.

11. The arrangement according to claim 1 wherein said comparator means includes means for generating a control signal when said ramped voltage signal crosses said servo signal and means for coupling said control signal to said power applying means.

12. The arrangement according to claim 1 wherein said speed detector means includes means for measuring the voltage across said power applying means.

13. An arrangement for controlling a DC motor from a source of AC power, comprising:

means for connecting a first side of said motor to a first side of said AC power source;

a triac connected between the second side of said motor and the second side of said AC power source for selectively applying power to said motor;

a triac protection circuit coupled to said triac;

threshold voltage detecting means connected to said second side of said motor for providing a threshold signal when the magnitude of the voltage at the second side of said motor exceeds a predetermined threshold;

ramping means responsive to said threshold signal for providing a ramped voltage signal for the duration of said threshold signal;

speed detector means coupled to said motor for providing a speed signal indicative of the speed of said motor;

input means for providing an input signal indicative of a desired speed for said motor;

servo means coupled to receive said speed signal and said input signal for providing a servo signal corresponding to the difference between said speed signal and said input signal; and comparator means coupled to receive said servo signal and said ramped voltage signal for controlling said triac.

14. The arrangement according to claim 13 wherein said triac protection circuit comprises high voltage clamping means connected across the output terminals of said triac for preventing the voltage across said terminals from exceeding a level damaging to said triac.

15. The arrangement according to claim 14 wherein said clamping means comprises a VMOS device.

16. The arrangement according to claim 13 wherein said triac protection circuit comprises a zener diode connected between the gate terminal of said triac and one of the output terminals of said triac for limiting the voltage and current across said gate terminal and said one output terminal.

17. The arrangement according to claim 13 wherein said triac protection circuit comprises a high frequency shunt circuit connected across the output terminals of said triac for preventing high frequency electrical noise from firing said triac.

18. An arrangement for controlling a DC motor from a source of AC power, comprising:

means for connecting a first side of said motor to a first side of said AC power source;

phase controlled power applying means connected between the second side of said motor and the second side of said AC power source for selectively applying power to said motor;

threshold voltage detecting means connected to said second side of said motor for providing a threshold signal when the magnitude of the voltage at the second side of said motor exceeds a predetermined threshold;

ramping means responsive to said threshold signal for providing a ramped voltage signal for the duration of said threshold signal;

speed detector means coupled to said motor for providing a speed signal indicative of the speed of said motor;

input means for providing an input signal indicative of a desired speed for said motor;

servo means coupled to receive said speed signal and said input signal for providing a servo signal corresponding to the difference between said speed signal and said input signal;

comparator means coupled to receive said servo signal and said ramped voltage signal for controlling said power applying means; and means for electrically isolating said comparator means from said power applying means.

19. The arrangement according to claim 18 wherein said power applying means includes a phase fired device and said isolating means includes a pulse transformer having its primary coupled to said comparator means and its secondary coupled to the control terminal of said phase fired device.

20. The arrangement according to claim 19 wherein said comparator means includes means for generating a pulse when said ramped voltage signal crosses said servo signal and means for coupling said pulse to said pulse transformer primary.

* * * * *